United States Patent Office 3,534,112
Patented Oct. 13, 1970

3,534,112
NITROALKANOLS FROM NITROALKANES AND FORMALDEHYDE
John B. Tindall, Terre Haute, Ind., assignor to Commercial Solvents Corporation, New York, N.Y., a corporation of Maryland
No Drawing. Filed Nov. 13, 1967, Ser. No. 682,547
Int. Cl. C07c *31/02, 31/20, 91/10*
U.S. Cl. 260—635
11 Claims

ABSTRACT OF THE DISCLOSURE

A process for the continuous production of aqueous nitroalkanol solutions by reacting a nitroalkane having 2 or 3 carbon atoms and formaldehyde in the presence of an alkaline catalyst and recycled reaction product at elevated temperatures.

SUMMARY OF THE INVENTION

This invention relates to the production of certain nitroalkanols. In a particular aspect, it relates to an improved continuous process for the production of aqueous nitroalkanol solutions by condensing a nitroalkane having 2 or 3 carbon atoms and formaldehyde.

Nitroalkanols have many uses, of which an important one is for the production of alkanolamines. Nitroalkanols have previously been produced in a 2-phase batch-wise process from nitroalkanes and formaldehyde in the presence of an alkaline catalyst and at room temperature. Sodium hydroxide was usually employed as the catalyst, and although generally satisfactory, it had the disadvantage that it could be removed satisfactorily only by an ion-exchange unit. Another disadvantage of the prior process was that reaction periods of several hours were required and yields fell short of theoretical. An attempt was made to use methanol as a reaction medium to provide a single phase reaction mixture, but the presence of methanol reduced the reaction rate, leading to even longer reaction times.

It is an object of this invention to provide an improved process for the production of nitroalkanols.

Another object of this invention is to provide a continuous process for the production of nitroalkanols.

Other objects of this invention will be obvious to those skilled in the art.

A continuous, single phase process has been discovered for the production of an aqueous solution of a nitroalkanol corresponding to the general formula

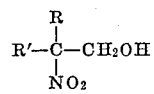

wherein R is methyl or ethyl and R' is methyl or hydroxymethyl, by reacting a nitroalkane having 2 or more carbon atoms with aqueous formaldehyde in the presence of an alkaline catalyst. According to the process of this invention, the reactants, e.g. nitroalkane and formaldehyde, are premixed with recycled reaction product to form a substantially single phase reaction mixture stream, catalyst is added, and the mixture is then passed into a first reaction zone for a residence time sufficient to effect the condensation of a major proportion of the reactants and form a reaction product; upon exiting from the first reaction zone, the stream of reaction product is split into two unequal portions, of which the larger, or major, portion is mixed with additional reactants, then is recycled to the first heating zone. Although some heating may be required to initiate the reaction, once started it is exothermic and considerable heat is given off in the first reaction zone. Accordingly, the reaction zone is equipped with a temperature control means, initially to heat the reaction stream to about 55° C., then to maintain the temperature below about 95° C. When the temperature rises above about 85° C., boiling may occur, so elevated pressure of up to 15 p.s.i.g. is applied.

The smaller, or minor, portion of the reaction product stream is passed to a second reaction zone for a period of time sufficient for the reaction to go substantially to completion. The second reaction zone is generally, but not necessarily, maintained at a lower temperature than that of the first reaction zone. From the second reaction zone, the product is delivered to a recovery process for recovery of nitroalkanol according to known methods, or it is delivered to a reduction unit for alkanolamine production.

DETAILED DESCRIPTION

As is known in the art, nitroalkanols are produced by condensing a nitroalkane and formaldehyde in a ratio of about 1 mole of nitroalkane to about 1 mole of formaldehyde for each hydroxy group of the nitroalkanol, i.e. about 1 to 2 moles of formaldehyde, in the presence of an alkaline catalyst.

According to the continuous process of this invention, the nitroalkane, the formaldehyde, including the water of solution and the catalyst, which constitute the feed, are mixed with recycled reaction product from a prior run in a volume ratio of about one of feed to about one to four or more, preferably two to four, of reaction product to provide a single phase reaction mixture.

The nitroalkanols which can be produced by this process include, but are not limited to, 2-nitro-2-methyl-1-propanol; 2-nitro-2-methyl-1,3-propanediol and 2-nitro-2-ethyl-1,3-propanediol.

The nitroalkanes suitable for the practice of this invention includes, but are not limited to, nitroalkanes of from 2 to 3 carbon atoms, i.e. nitroethane, 1-nitropropane and 2-nitropropane.

Formaldehyde suitable for the practice of this invention is preferably supplied as an aqueous formaldehyde solution. Such solutions are commercially available as 37% by weight and 44% by weight formaldehyde. The formaldehyde can be inhibited with 8–12% methanol or it can be uninhibited. Gaseous formaldehyde from a methanol oxidation unit can also be used, but when this is done, a suitable amount of water is added to the feed to provide a solution.

Any suitable apparatus can be employed in the practice of this invention, but one which has given satisfactory results consists of a first reactor having a temperature control means, a stream splitter, a second reactor which is conveniently provided by a hold tank having a temperature control means, and additionally a reservoir and two feed tanks.

The two feed tanks, equipped with pumps, open into a feed line leading to the first reactor. Also opening into the feed line, preferably at a point near the first reactor, is a means for injecting a catalyst. One feed tank is used for the nitroalkane and the second feed tank is used for formaldehyde and recycled reaction product. When the reactants are pumped to the reactor, the force of pumping is generally adequate to provide satisfactory mixing of the mixture.

Alternatively, the nitroalkane, formaldehyde, catalyst and recycled reaction product can be premixed in a single feed tank before delivery to the reaction zone, or a separate feed tank can be provided for each, without departing from the concept of this invention.

The first reactor is conveniently constructed of a pipe or tube equipped with a temperature control means, e.g. a water or steam jacket through which cooling water, or hot water or steam when heat is needed, as when starting up the process, is passed. The temperature is maintained at from about 55° to about 95° C., preferably at from 65° to 85° C. A particularly preferred temperature is 75° C. The reactor is selected to be of such a length and diameter as to provide a residence time of from about 40 minutes at 55° C., to 2.5 minutes at 95° C., and from 20 minutes at 65° C., to 5 minutes at 85° C., at a given pumping rate. At 75° C. the preferred residence time is 10 minutes.

From the first reactor the reaction product stream is conducted to a splitter, e.g. a conventional reflux splitter, dividing the reaction product stream into two uneven portions. Generally, the stream is divided in a ratio of from about 1.5:1 to about 4.5:1, preferably about 3.5:1. The major portion from the splitter is conveniently accumulated in a reservoir tank from which it is periodically transferred to the second feed tank where it is mixed with formaldehyde preparatory for recycle. In another embodiment of this process, however, the recycled portion is returned directly and continuously to the feed line to the reactor and nitroalkane, formaldehyde and catalyst are similarly injected continuously in the preferred proportions into the feed line.

The minor portion from the splitter is delivered to a hold tank, i.e. the second reactor, where it is held at an elevated temperature of 50° to 75° C., preferably 55–70° C. for a residence time sufficient for the condensation reaction to go substantially to completion, i.e. for about 160 minutes at 50° to about 30 minutes at 75°, preferably from about 40 minutes at 70° to about 130 minutes at 55°. A particularly preferred temperature is 65° for a residence time of about 60 minutes.

Generally, the rate of heat loss in the second reactor is such that no cooling of the reaction stream coming from the splitter is required. Some cooling may be desirable however, particularly when the first reaction zone is operated at a high temperature.

The nitroalkanol solution thereby produced can be used without further treatment. Generally, however, it is transferred to the hydrogenation unit for alkanolamine production or to a recovery unit for production of recovered nitroalkanol.

The water employed in the reaction mixture is generally supplied by the formaldehyde solution. Additional water is supplied when desired.

The catalyst is used in condensation-promoting amounts, and is mixed with the formaldehyde and recycled product, or it is conveniently injected into the stream of reactants in the feed line between the feed tanks and the reactor. Suitable catalysts include inorganic alkaline compounds, such as alkali and alkaline earth hydroxides, and alkali carbonates, and non-reacting organic bases, such as tertiary amines. Trimethylamine is a preferred catalyst, preferably anhydrous, but an aqueous solution is also suitable. It is used in an amount sufficient to provide a normality of 0.02–0.03 in the reaction mixture. When an inorganic catalyst is used, it is removed by means of an ion-exchange resin prior to hydrogenation or recovery of the nitroalkanol.

The following examples further illustrate the practice of this invention.

EXAMPLE 1

Preparation of 2-nitro-2-methyl-1-propanol

For this experiment the following apparatus was constructed:

Two glass feed tanks were provided, the first of about 2 liter capacity and the second of about 5 liter capacity, and each was equipped with a pump. The feed tanks discharged to a single feed line to the reactor which provided a first reaction zone. The feed line was of ⅛ inch stainless steel tube and was constructed of the same material as the reactor. Between the feed tanks and the reactor, an inlet was provided for injection of catalyst.

The reaction consisted of ⅛ inch 304 stainless steel tubing encased in a water jacket through which hot or cold water as needed was circulated to maintain a temperature of 70 to 80° C. From the reactor the tube extended to a conventional 3.5:1 reflux splitter of the type used in distillations. During operation the minor portion of the reaction stream from the splitter was directed to a hold tank equipped with a temperature control so that the contents could be maintained at 50–55° C. (generally it was necessary to supply additional heat). The major portion of the reaction stream from the splitter was directed to a reservoir from which it was periodically transferred to the second feed tank for mixing with formaldehyde.

A mixture consisting of 5.34 l. of condensation product previously prepared, and 1210 ml. of 37% formaldehyde solution was delivered to the second feed tank. Half of the above was immediately delivered to the preheated reactor to fill it. In the first feed tank, 340 ml. of 2-nitropropane was placed, and when the reactor was full, continuous addition of 2-nitropropane at the rate of 340 ml./0.5 hour and the fromaldehyde feedstock remaining in the first feed tank at a rate of 1520 ml. per half hour was commenced. Trimethylamine, liquid anhydrous, from a pressurized cylinder was added at a rate of 4.23 g./hour through the catalyst injection inlet.

As the reaction product exited from the reaction zone, it was passed to the splitter where it was divided at a ratio of 3.5:1. The minor portion, 400–425 ml. per 30 minutes, was delivered to the hold tank, i.e. the second reaction zone, where it was maintained for 130 minutes at 50–55° C., then was delivered to the hydrogenation unit for conversion to the amino alcohol.

The major portion of the reaction product stream was delivered to a reservoir tank at the rate of 1350–1400 ml. per 30 minutes, and at the end of each hour the accumulated product, the recycle fraction, 2700–2800 ml., was pumped to the second feed tank, 605 ml. of formaldehyde was added with mixing and the mixture was pumped into the reactor over a period of about an hour.

The above pumping schedule provided a residence time in the first reactor of about 10 minutes and the temperature was maintained at about 75° C.

The recycle fraction was titrated hourly at the splitter to determine trimethylamine content; if below 0.025 normal, the trimethylamine input was increased, and if above 0.03 normal, it was reduced.

In this manner the process was operated on a continuous basis. When a shutdown was required, 5.34 liters of reaction product were reserved for subsequent start-up operations.

EXAMPLE 2

The experiment of Example 1 is repeated except that the process is operated on a continuous basis at a temperature in the first reactor of from 55° to 95° C., and in the second reactor from 50° to 75° C. When the temperature in the first reactor is above about 85° C., a pressure of up to 15 p.s.i.g. is applied to prevent boiling.

EXAMPLE 3

The experiment of Example 1 is repeated except that 1020 ml. of 44% formaldehyde solution is substituted for the 1210 ml. of 37% formaldehyde solution and subsequent formaldehyde feed. A high yield of 2-nitro-2-methyl-1-propanol is obtained.

EXAMPLE 4

The experiment of Example 1 is repeated except that nitroethane is substituted for 2-nitropropane and two molar equivalents of formaldehyde are employed per mole of nitroethane. A high yield of 2-nitro-2-methyl-1,3-propanediol is obtained.

EXAMPLE 5

The experiment of Example 4 is repeated except that 1-nitropropane is substituted for nitroethane. A high yield of 2-nitro-2-ethyl-1,3-propanediol is obtained.

I claim:

1. In a continuous process for the production of an aqueous solution of a nitroalkanol corresponding to the formula

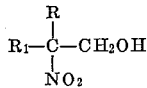

where R is methyl or ethyl and R' is methyl or hydroxymethyl, said nitroalkanol having from 1 to 2 hydroxy groups per molecule, by the condensation of a nitroalkane having 2 to 3 carbon atoms with formaldehyde in a mole ratio of about 1:1 when R' is methyl or 1:2 when R' is hydroxymethyl in the presence of an alkaline catalyst at a temperature of 55–95° C., the improvement consisting of the steps of:

(a) mixing about one volume of said nitroalkane, aqueous formaldehyde and catalyst with from 1 to about 4 volumes of a nitroalkanol-containing reaction product of said nitroalkane, formaldehyde and catalyst, thereby forming a substantially single-phase reaction mixture, (b) adding additional quantities of said nitroalkane, formaldehyde and catalyst, (c) passing said mixture through a first reaction zone at said temperature for a residence time in the range of from 40 minutes at 55° C., to 2.5 minutes at 95° C., whereby said nitroalkane and formaldehyde substantially condense to form a reaction product including said nitroalkanol in aqueous solution, (d) dividing said reaction product into a major portion and a minor portion, (e) recycling said major portion to step (a) above as the said nitroalkanol-containing reaction product, (f) delivering said minor portion to a second reaction zone for a residence time in the range of about 160 minutes at 50° C. to 30 minutes at 75° C. whereby production of said aqueous solution of nitroalkanol is substantially completed.

2. The process of claim 1 wherein the nitroalkane is nitroethane and the nitroalkanol thereby produced is 2-nitro-2-methyl-1,3-propanediol.

3. The process of claim 1 wherein the nitroalkane is 1-nitropropane and the nitroalkanol thereby produced is 2-nitro-2-ethyl-1,3-propanediol.

4. The process of claim 1 wherein the nitroalkane is 2-nitropropane and the nitroalkanol thereby produced is 2-nitro-2-methyl-1-propanol.

5. The process of claim 1 wherein the volume of the recycled reaction product is twice the volume of the nitroalkane and formaldehyde.

6. The process of claim 1 wherein the residence time in said first reaction zone is within the range of from about 20 minutes at 65° C. to about 5 minutes at 85° C.

7. The process of claim 1 wherein the temperature of the first reaction zone is 75° C. and the residence time therein is about 10 minutes.

8. The process of claim 1 wherein said major portion of the reaction product has a volume about 3.5 times the volume of the minor portion.

9. The process of claim 1 wherein the residence time in said second reaction zone is within the range of from about 160 minutes at 50° C. to about 30 minutes at 75° C.

10. The process of claim 1 wherein the residence time in said second reaction zone is within the range of from about 130 minutes at 55° C. to about 40 minutes at 70° C.

11. The process of claim 1 wherein the temperature of said second reaction zone is about 65° C. and the residence time therein is about 60 minutes.

References Cited

UNITED STATES PATENTS

| | | | |
|---|---|---|---|
| 2,135,444 | 11/1938 | Vanderbilt | 260—635 |
| 2,231,403 | 2/1941 | Wyler | 260—635 |
| 2,232,674 | 2/1941 | Pyzel | 260—635 |
| 2,301,259 | 11/1942 | Cox | 260—638 |

OTHER REFERENCES

Vanderbilt et al., "Ind. and Eng. Chem.," vol. 32 (1940), pp. 34–38.

BERNARD HELFIN, Primary Examiner

J. E. EVANS, Assistant Examiner

U.S. Cl. X.R.

260—638, 584